March 13, 1945.　　　L. S. SEAMAN　　　2,371,269
AIRCRAFT ICE PREVENTER
Filed Dec. 15, 1941　　　2 Sheets-Sheet 1
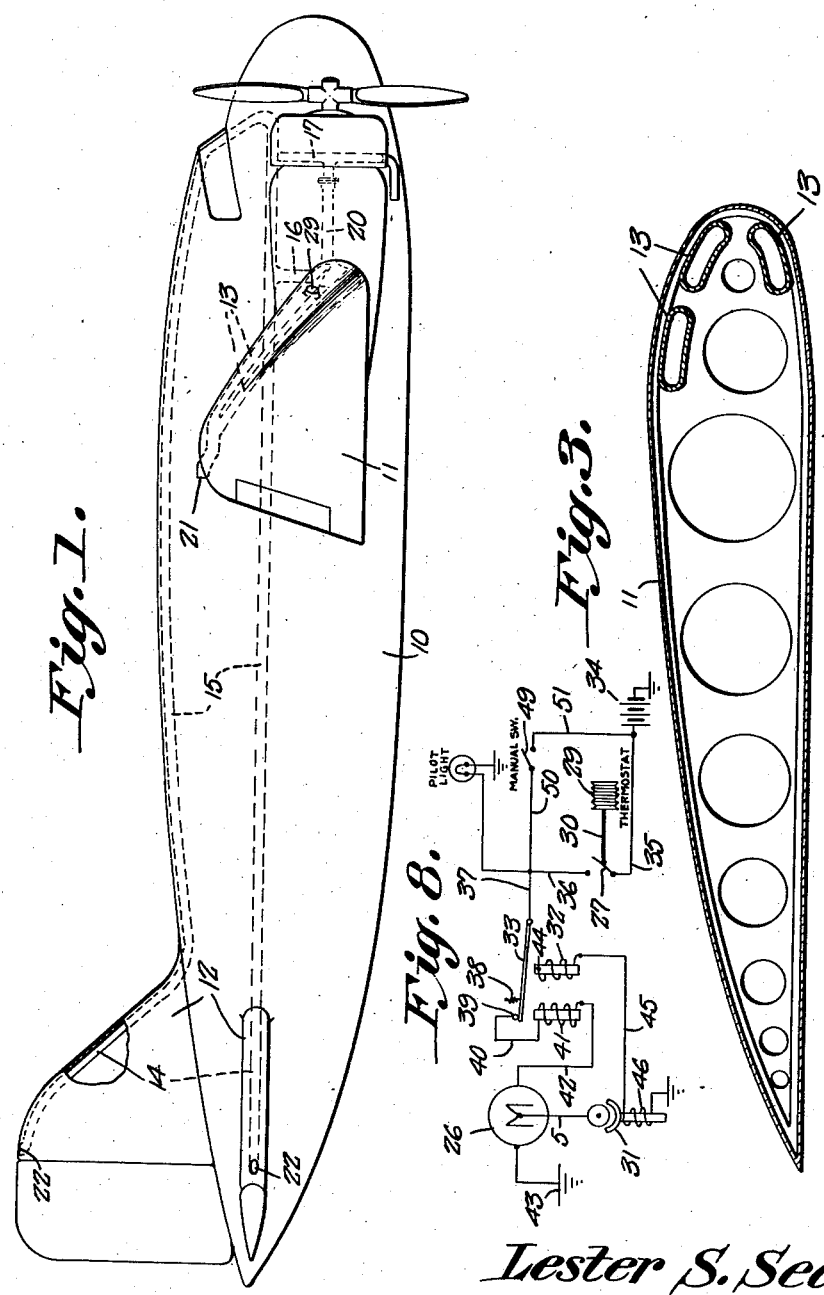
WITNESSES:
Lester S. Seaman,
INVENTOR.
BY
Victor J. Evans & Co.
ATTORNEYS March 13, 1945.　　　L. S. SEAMAN　　　2,371,269
AIRCRAFT ICE PREVENTER
Filed Dec. 15, 1941　　　2 Sheets-Sheet 2
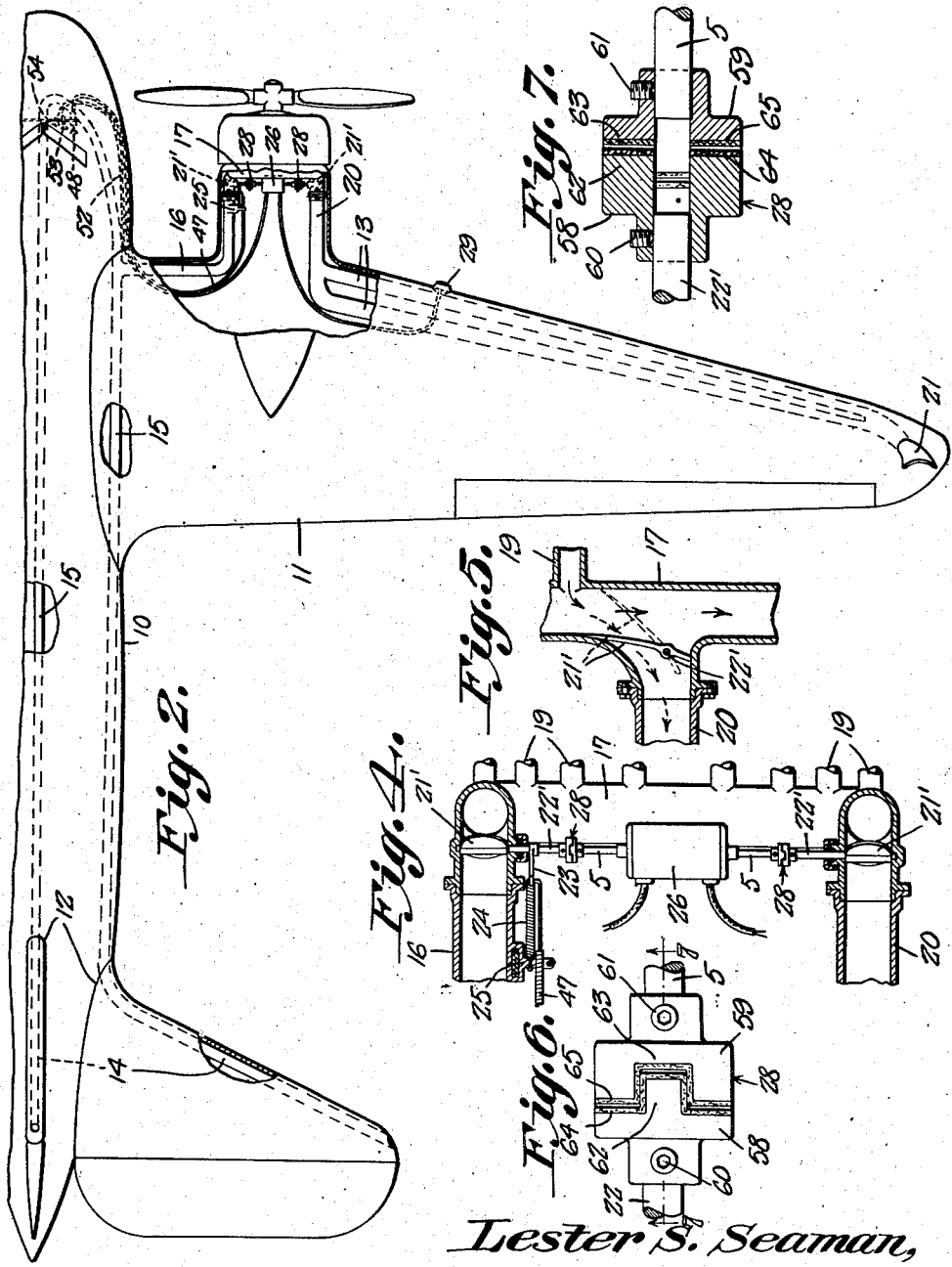
Lester S. Seaman,
INVENTOR.
WITNESSES:
BY
Victor J. Evans & Co.
ATTORNEYS Patented Mar. 13, 1945

2,371,269

UNITED STATES PATENT OFFICE 2,371,269

AIRCRAFT ICE PREVENTER

Lester S. Seaman, Coronado, Calif.

Application December 15, 1941, Serial No. 423,089

1 Claim. (Cl. 244—134)

This invention relates to an aircraft ice preventer and has for an object to provide apparatus for utilizing the heat of the exhaust of one or more cylinders of the engine to heat the leading edges of the wings and the tail group, as well as the fuselage, when the outside temperature is low enough to cause the formation of ice, the operation of the apparatus being controlled by a thermostat so as not to require manual attention.

A further object is to provide apparatus of this type which may be manually controlled from the pilot's cockpit when desired.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming a part of this specification:

Figure 1 is a side elevation of an airplane equipped with ice preventer apparatus constructed in accordance with the invention.

Figure 2 is a fragmentary top plan view of the airplane and apparatus shown in Figure 1.

Figure 3 is a cross sectional view showing one of the wings equipped with heating tubes in the leading edge.

Figure 4 is a detail plan view, with parts in section, showing the motor operated control valves and the heat collector ring.

Figure 5 is a detail sectional view showing one of the control valves.

Figure 6 is a plan view of one of the asbestos faced clutches.

Figure 7 is a longitudinal sectional view taken on the line 7—7 of Figure 6.

Figure 8 is a diagrammatic view showing the electrical connections of the apparatus.

Referring now to the drawings in which like characters of reference designate similar parts in the various views, 10 designates the fuselage, 11 the wings and 12 the tail group of a conventional airplane. In carrying out the invention heating tubes 13 are disposed in the leading edges of the wings and heating tubes 14 are disposed in the leading edges of the tail group. Tubes 15 connected together at the front ends, extend longitudinally of the fuselage and extend at the rear ends into the tail group. A tube 16 is connected to one of these tubes and communicates with a heat collector ring 17 which may be connected to the engine by pipes 19, see Figure 4, so that the exhaust of one or more cylinders will enter the pipes 16 and 15. A pipe 20 is connected to the pipes 13 of the wings and also is connected to the collector ring.

The wing pipes 13 are connected at the outer ends to an exhaust nozzle 21 which opens through the upper skin of the wings. The tail group pipes 15 exhaust through openings 22 formed in the rear ends of the leading edges of the tail group. The system of pipes above described are adapted to heat the leading edges of the wings and of the tail group and also to heat the fuselage since the pipes 15, as best shown by Figure 2, extend forwardly to the pilot's cockpit. This heating of the fuselage, wings and tail group prevent the formation of ice on these parts.

The pipes 16 and 20 are controlled by respective flap valves one of which is shown at 21' in Figure 5. Each flap valve is curved in contour and is connected near one end to a respective shaft 22 for opening the valve. A crank 23 is connected to one shaft 22 and to a projection 25 on the pipe 16, by a spring 24, for example, to close the valves.

The valves 21' of both the pipes 16 and 20 are automatically opened by an electric motor 26, see Figure 4, having its armature shaft 5 connected to both the aforesaid shafts 22 by asbestos faced clutches 28, shown in detail in Figures 6 and 7, which prevent heat being conducted from the heating pipes 16 and 20 and damaging the windings of the motor.

A thermostat 29 is disposed in the leading edge of one of the wings 11 and is connected by a flexible shaft 30, see Figure 2, to a starting switch 27, shown conventionally in Figure 8, and housed within the shell of the motor, or located at any desired point in the motor circuit, hereinafter described.

When a temperature of thirty-two degrees F. is reached, at which temperature ice tends to form on the aircraft, the thermostat will operate the shaft 30 to close the switch 27 and start the motor. When the motor starts both valves 21' will be opened by rotation of the armature shaft and will admit hot exhaust gases from the collecting ring 17 to the heating pipes of the wings and of the tail group.

The motor need be actuated only momentarily so that the control valves 21' will be swung to open position. For stopping rotation of the motor at a desired moment an electromagnetic brake 31 is assembled with the armature shaft of the motor and is connected to a relay coil 32 having an armature 33 which forms the movable member of a switch connected in the motor circuit which may be traced as follows. From the source of electric current 34 a conductor wire 35 leads to the thermostat switch 27, and from the switch a conductor wire 36 is connected to a conductor wire 37 which in turn is connected to the armature 33. The armature is held by its spring 38 against a stationary contact 39 to which is connected a conductor wire 40. The wire 40 is connected to a magnet coil 41 of the aforesaid relay and the other end of the coil is connected by a wire 42 to one side of the motor 26, the other side of the motor being grounded as shown at 43.

When the thermostat 29 closes the switch 27 current will flow from the source of electricity 34, through the wire 35, switch 27, wire 36, wire 37, armature 33, wire 40, coil 41 of the relay and wire 42 to the motor to start the motor.

When the motor has turned sufficiently to open the control valves 21' the control valves will lodge against their respective seats in fully opened position and consequently tend to resist rotation of the motor armature shaft. This places an overload on the coil 41 so that the coil can then attract the armature 33 and open the motor circuit at the stationary contact 29. The rotation of the motor armature is immediately stopped by the electromagnetic brake 31 and this is accomplished as follows. When the armature 33 is attracted by the coil 41 it moves into engagement with a terminal 44 of the aforesaid coil 32 which coil is connected by a conductor wire 45 to the coil 46 of the brake. Thereupon the source of electricity is connected to the electromagnetic brake through the armature 33, terminal 44, coil 32, and wire 45 to energize the brake and instantly stop rotation of the motor armature. While the motor circuit is closed at the switch by low temperature operation of the thermostat 29, and is opened at the fixed contact 39, the coil 32 will remain energized to hold the brake 31 applied and maintain the control valves wide open. However when the temperature rises sufficiently to prevent ice forming on the airplane the thermostat will operate the flexible shaft 30 to open the control switch 27 of the motor circuit and shut off current from the coil 32 of the relay to deenergize the coil and deenergize the electromagnetic brake 46. Thereupon the aforesaid spring 24 which is connected to the crank 23 of one of the shafts 22 actuates the crank to rotate the said shaft, and since both clutches 28 are normally in clutched position, will cut off supply of hot exhaust gases from the collection ring.

In order to manually open the valves 21', a flexible shaft 47 is connected to the crank 23 and is connected to a conventional push rod 48 on the pilot's instrument board or at some other desired location on the aircraft. By pressing in the push rod the flexible shaft is actuated to rock the crank 23 and open both control valves 21'. The push rod may be held locked in any suitable manner in pushed in position should the electric connections fail to maintain the control valves open. When the push rod is released the aforesaid spring 24 closes the valves as above described.

A manually operable switch 49 is disposed in the motor circuit in a shunt circuit formed by conductor wires 50 and 51, around the thermostat 29, see Figure 8. The switch is connected by a flexible shaft 52 to a push rod 53 on the instrument board, or other location for operating the switch.

To indicate when the defroster and heater is in operation, a pilot lamp 54 is disposed upon the instrument board and is connected by a circuit wire 55 to the wire 50 at its connection 56 with the wire 37.

The aforesaid asbestos faced clutches 28 are each formed of two cylindrical parts 58 and 59, see Figures 6 and 7, secured to the respective shaft 22 and armature shaft 5 by set screws 60 and 61. One of the parts is provided with a tongue 62 which fits in a groove 63 formed in the other part, see Figure 6. The confronting faces of the clutch parts are faced with respective sheets of asbestos 64 and 65. The clutch is normally in clutched position and may be declutched by loosening of the set screws 60 and 61 to permit dismantling of the motor when desired.

Since the operation of the parts has been described as the description of the parts progressed it is thought the invention will be fully understood without further explanation.

What is claimed is:

In an aircraft, a plurality of heating conduits disposed in heating relation with selected parts thereof and in communicative connection with the exhaust gases of an engine, a valve disposed to control the passage of the exhaust gases into each of the said heating conduits, means yieldingly holding the said valves in closed position, an electrically operated means connected to the said valves for opening the same, electrically controlled means operative to hold the valves in open position, and temperature responsive means electrically connected with the valve opening and holding means whereby to maintain the said valves open when the aircraft is exposed to temperature below a predetermined degree.

LESTER S. SEAMAN.